United States Patent
Shiozaki et al.

(10) Patent No.: US 9,804,324 B2
(45) Date of Patent: Oct. 31, 2017

(54) MULTIMODE OPTICAL FIBER

(71) Applicant: SUMITOMO ELECTRIC INDUSTRIES, LTD., Osaka-shi, Osaka (JP)

(72) Inventors: Manabu Shiozaki, Yokohama (JP); Kazuhiro Yonezawa, Yokohama (JP); Tadashi Enomoto, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 141 days.

(21) Appl. No.: 14/609,689

(22) Filed: Jan. 30, 2015

(65) Prior Publication Data

US 2016/0291246 A1 Oct. 6, 2016

(51) Int. Cl.
*G02B 6/028* (2006.01)
*G02B 6/036* (2006.01)
*C03C 13/04* (2006.01)
*C03C 25/10* (2006.01)

(52) U.S. Cl.
CPC .......... *G02B 6/0288* (2013.01); *C03C 13/046* (2013.01); *C03C 25/107* (2013.01); *G02B 6/0365* (2013.01); *C03C 2201/28* (2013.01); *C03C 2201/31* (2013.01); *G02B 6/03627* (2013.01)

(58) Field of Classification Search
CPC .. G02B 6/0288; G02B 6/0281; G02B 6/0365; G02B 6/03627; G02B 6/036; G02B 6/03611; G02B 6/028; C03C 13/046; C03C 2201/12; C03C 2201/31; C03C 2203/46; C03C 2203/14; C03C 2203/28

USPC .................................. 385/124, 126, 127
See application file for complete search history.

(56) References Cited

U.S. PATENT DOCUMENTS

| 8,644,664 B2 | 2/2014 | Molin et al. |
| 2004/0156401 A1* | 8/2004 | Sandrock .......... C03B 37/01426 372/6 |
| 2009/0148112 A1* | 6/2009 | Koyamada ......... G02B 6/03638 385/127 |
| 2013/0114934 A1 | 5/2013 | Bookbinder et al. |
| 2013/0114935 A1 | 5/2013 | Bookbinder et al. |
| 2016/0147012 A1* | 5/2016 | Wang ................... G02B 6/0288 385/124 |

OTHER PUBLICATIONS

Denis Molin et al., "WideBand OM4 Multi-Mode Fiber for Next-Generation 400Gbps Data Communications", ECOC 2014, Cannes-France, p. 1.6, 2014.

* cited by examiner

*Primary Examiner* — Kaveh C Kianni
*Assistant Examiner* — Hung Lam
(74) *Attorney, Agent, or Firm* — Drinker Biddle & Reath LLP

(57) ABSTRACT

An embodiment of the invention relates to a GI-MMF with a structure for achieving widening of bandwidth in a wider wavelength range and improving manufacturing easiness of a refractive index profile in a core. In an example of the GI-MMF, a whole region of the core is doped with Ge and a part of the core is doped with P. Namely, the Ge-doped region coincides with the whole region of the core and the Ge-doped region is comprised of a partially P-doped region doped with Ge and P; and a P-undoped region doped with Ge but not intentionally doped with P.

2 Claims, 11 Drawing Sheets

MULTIMODE OPTICAL FIBER

BACKGROUND OF THE INVENTION

Field of the Invention

The present invention relates to a multimode optical fiber having a GI (Graded Index) type refractive index profile.

Related Background Art

It is known that a multimode optical fiber (hereinafter referred to as MMF) has a larger transmission loss because of its structure than a single-mode optical fiber (hereinafter referred to as SMF) for long-haul optical transmission. On the other hand, the MMF is widely used for short-haul information transmission like LAN (Local Area Network) because it is easy to establish fiber-fiber connection and it becomes feasible to readily construct a network by making use of low-demand-performance equipment.

In recent years, studies have been actively conducted on technologies to reduce the aforementioned transmission loss of the MMF and on expansion of the transmission bandwidth (widening of bandwidth) thereof as well, for the purpose of improvement in signal quality in the foregoing short-haul information transmission. Particularly, for achieving the widening of bandwidth in a wider wavelength range with needs for increase in transmission capacity, for example, each of U.S. Pat. Application Publication US2013/0114934A1 (Patent Literature 1), U.S. Pat. Application Publication US2013/0114935A1 (Patent Literature 2), U.S. Pat. No. 8,644,664 (Patent Literature 3), and Denis Molin, Frank Achten, Marianne Bigot, Adrin Amezcua-Correa, and Pierre Sillard, "WideBand OM4 Multi-Mode Fiber for Next-Generation 400 GHz Data Communications," ECOC 2014, Cannes-France, P1.6 (Non Patent Literature 1) discloses the MMF the core of which has the GI refractive index profile conforming to the α-profile (which will be referred to hereinafter as GI-MMF).

SUMMARY OF THE INVENTION

The Inventors conducted research on the conventional GI-MMFs and found the problem as described below. Namely, all of the GI-MMFs described in the foregoing Patent Literatures 1 to 3 have the core formed with the GI refractive index profile conforming to the α-profile and the core of each GI-MMF is doped with germanium (hereinafter represented by "Ge") as a base dopant and is co-doped with a refractive index controlling dopant except for Ge, throughout the whole region thereof. However, an advanced fiber manufacturing technology is required to accurately control the shape of the α-profile in the core co-doped with multiple dopants throughout the whole region as described above, which can cause decrease of manufacturing yield. Particularly, in the case of the GI-MMF required to have a larger transmission bandwidth at a specific wavelength or in a specific wavelength range, it is necessary to accurately create the refractive index profile (GI refractive index profile conforming to the α-profile) in the core. In other words, it is necessary to highly accurately control doping concentrations of the dopants to be co-doped, in a core manufacturing process.

The present invention has been accomplished in order to solve the problem as described above and it is an object of the present invention to provide a GI-MMF having a structure for realizing expansion of Effective Modal Bandwidth (EMB) being one of transmission bandwidths, in a wider wavelength range used in Wavelength-Division Multiplexing (WDM) transmission, and for improving manufacturing easiness of the refractive index profile in the core.

An embodiment of the invention relates to the GI-MMF the core of which has the GI refractive index profile conforming to the α-profile, which is definitely discriminated in terms of structure from the SMF for long-haul transmission. For solving the aforementioned problem, the GI-MMF according to the embodiment of the invention comprises, at least, a core extending along a direction of a predetermined axis and a cladding provided on an outer peripheral surface of the core. The whole core is doped with Ge as a base dopant and a part of the core is doped with phosphorus (hereinafter represented by "P") or fluorine (hereinafter represented by "F"). The foregoing Ge, P, and F all are known as dopants to control the refractive index of glass and it becomes possible to form the GI refractive index profile in the core region, by selecting regions doped with these dopants and appropriately adjusting doping amounts thereof. Particularly, in the embodiment of the invention, the manufacturing easiness of the GI refractive index profile in the core is realized by two modes below.

(1) In a configuration wherein the core is doped with Ge and P, the core has the GI refractive index profile formed by doping with Ge and P. In a cross section of the core perpendicular to the predetermined axis, a Ge-doped region doped with Ge coincides with the whole region of the cross section of the core. On the other hand, in the cross section of the core, the Ge-doped region is comprised of a partially P-doped region which results from doping with P and in which a relative refractive index difference with respect to the cladding is controlled; and a P-undoped region in which a doping amount of P is set to be not more than 5% of a maximum doping amount of P in the partially P-doped region.

(2) On the other hand, in a configuration wherein the core is doped with Ge and F, the core has the GI refractive index profile formed by doping with Ge and F. In the cross section of the core perpendicular to the predetermined axis, a Ge-doped region doped with Ge coincides with the whole region of the cross section of the core. On the other hand, in the cross section of the core, the Ge-doped region is comprised of a partially F-doped region which results from doping with F and in which a relative refractive index difference with respect to the cladding is controlled; and an F-undoped region in which a doping amount of F is set to be not more than 5% of a maximum doping amount of F in the partially F-doped region.

DETAILED DESCRIPTION OF EMBODIMENTS

Description of Embodiment of Present Invention

Figure 1A:
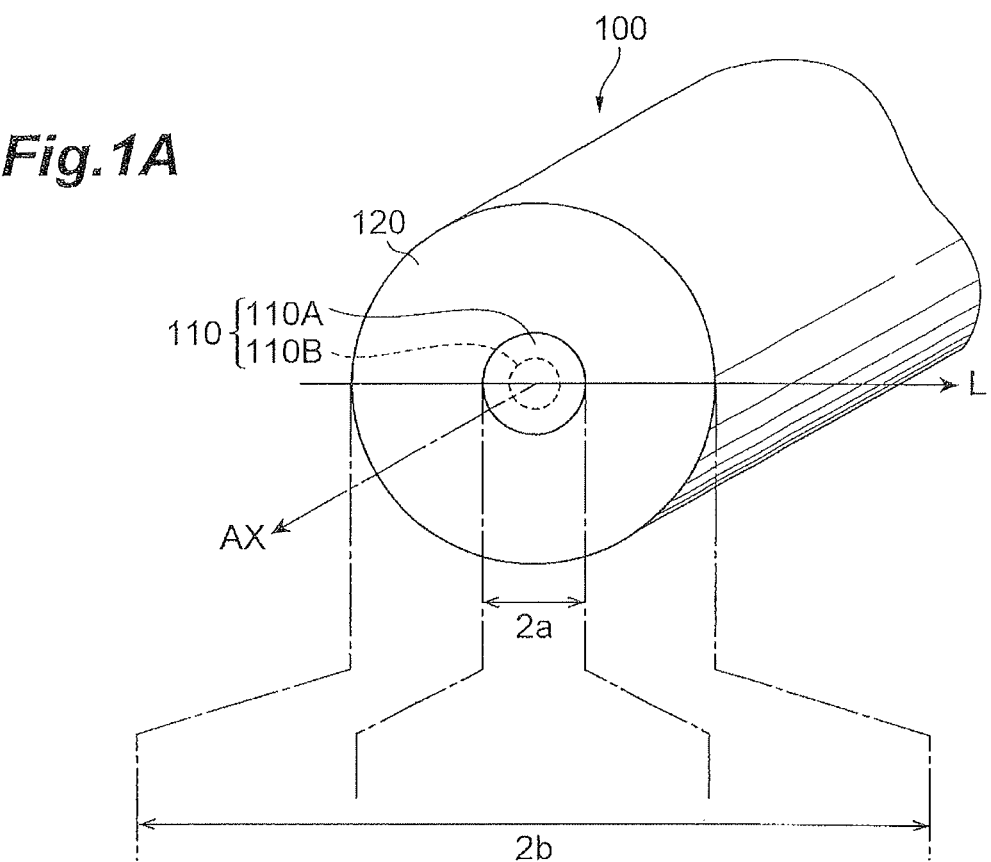
FIG. 1A is a cross-sectional view showing a typical structure of the GI-MMF according to the embodiment of the invention and FIG. 1B a refractive index profile thereof.

Aspects of the embodiment of the present invention will be first described as enumerated.

(1) As a first aspect, a GI-MMF according to the embodiment of the invention comprises: a core extending along a predetermined axis and doped with Ge and P; and a cladding provided on an outer peripheral surface of the core. The core has a GI type refractive index profile formed by doping with Ge and P. In a cross section of the core perpendicular to the predetermined axis, a Ge-doped region doped with Ge coincides with a whole region of the cross section of the core. Furthermore, in the cross section of the core, the Ge-doped region is comprised of a partially P-doped region and a P-undoped region. The partially P-doped region is a region doped with Ge and intentionally doped with P. The P-undoped region is a region doped with Ge but not intentionally doped with P, and, specifically, it is a region in which a doping amount of P is set to be not more than 5% of a maximum doping amount of P in the partially P-doped region. In the present specification, this P-undoped region is defined as a region in which a relative refractive index difference resulting from doping with P is set to be substantially 0%. Therefore, the shape of the refractive index profile in the partially P-doped region along the radial direction of the core is determined by controlling both of the relative refractive index difference resulting from the doping with Ge and the relative refractive index difference resulting from the doping with P. Furthermore, the shape of the refractive index profile in the P-undoped region is determined substantially by controlling only the relative refractive index difference resulting from the doping with Ge.

(2) As a second aspect applicable to the first aspect, preferably, in the Ge-doped region the P-undoped region is arranged so as to surround the whole of the partially P-doped region.

(3) As a third aspect applicable to at least either one of the foregoing first and second aspects, preferably, the partially P-doped region and the P-undoped region are arranged in contact with each other. In this region arrangement, when r represents a distance from a center of the core to a boundary between the partially P-doped region and the P-undoped region and Δn(P) does a maximum relative refractive index difference resulting from the doping with P in the partially P-doped region with respect to the cladding, the distance r is preferably set so that an evaluation function defined by Expression (1) below becomes maximum, $$\min\left(\frac{B_{0.850}}{4.700}, \frac{B_{0.875}}{4.200}, \frac{B_{0.900}}{3.600}, \frac{B_{0.925}}{3.300}, \frac{B_{0.950}}{3.100}\right) \quad (1)$$

where $B_{0.850}$ is an EMB (GHz·km) being one of transmission bandwidths at the wavelength 0.850 μm, with variation of the distance r and the maximum relative refractive index difference Δn(P), the numeral 4.700 a target EMB (GHz·km) at the wavelength 0.850 μm, $B_{0.875}$ an EMB (GHz·km) at the wavelength 0.875 μm, with variation of the distance r and the maximum relative refractive index difference Δn(P), the numeral 4.200 a target EMB (GHz·km) at the wavelength 0.875 μm, $B_{0.900}$ an EMB (GHz·km) at the wavelength 0.900 μm, with variation of the distance r and the maximum relative refractive index difference Δn(P), the numeral 3.600 a target EMB (GHz·km) at the wavelength 0.900 μm, $B_{0.925}$ an EMB (GHz·km) at the wavelength 0.925 μm, with variation of the distance r and the maximum relative refractive index difference Δn(P), the numeral 3.300 a target EMB (GHz·km) at the wavelength 0.925 μm, $B_{0.950}$ an EMB (GHz·km) at the wavelength 0.950 μm, with variation of the distance r and the maximum relative refractive index difference Δn(P), and the numeral 3.100 a target EMB (GHz·km) at the wavelength 0.950 μm. The EMB is, for example, one of the transmission bandwidths defined by the OM3 (A1a.2) and OM4 (A1a.3) Standards of ISO/IEC1801.

(4) As a fourth aspect applicable to at least any one of the foregoing first to third aspects, preferably, the partially P-doped region is doped with a constant doping amount of P along a radial direction of the core.

(5) As a fifth aspect, a GI-MMF according to the embodiment of the invention may comprise: a core extending along a predetermined axis and doped with Ge and F; and a cladding provided on an outer peripheral surface of the core. In this case, the core has a GI type refractive index profile formed by doping with Ge and F. In a cross section of the core perpendicular to the predetermined axis, a Ge-doped region doped with Ge coincides with a whole region of the cross section of the core. Furthermore, in the cross section of the core, the Ge-doped region is comprised of a partially F-doped region and an F-undoped region. The partially F-doped region is a region doped with Ge and intentionally doped with F. The F-undoped region is a region doped with Ge but not intentionally doped with F, and, specifically, it is a region in which a doping amount of F is set to be not more than 5% of a maximum doping amount of F in the partially F-doped region. In the present specification, this F-undoped region is defined as a region in which a relative refractive index difference resulting from doping with F is set to be substantially 0%. Therefore, the shape of the refractive index profile in the partially F-doped region along the radial direction of the core is determined by controlling both of the relative refractive index difference resulting from the doping with Ge and the relative refractive index difference resulting from the doping with F. Furthermore, the shape of the refractive index profile in the F-undoped region is determined substantially by controlling only the relative refractive index difference resulting from the doping with Ge.

(6) As a sixth aspect applicable to the fifth aspect, preferably, in the Ge-doped region the partially F-doped region is arranged so as to surround the whole of the F-undoped region.

(7) As a seventh aspect applicable to at least either one of the foregoing fifth and sixth aspects, preferably, the partially F-doped region and the F-undoped region are arranged in contact with each other. In this region arrangement, when r represents a distance from a center of the core to a boundary between the partially F-doped region and the F-undoped region and Δn(F) does a minimum relative refractive index difference resulting from the doping with F in the partially F-doped region with respect to the cladding, the distance r is preferably set so that an evaluation function defined by Expression (2) below becomes maximum.

$$\min\left(\frac{B_{0.850}}{4.700}, \frac{B_{0.875}}{4.200}, \frac{B_{0.900}}{3.600}, \frac{B_{0.925}}{3.300}, \frac{B_{0.950}}{3.100}\right) \quad (2)$$

where $B_{0.850}$ is an EMB (GHz·km) being one of transmission bandwidths at the wavelength 0.850 μm, with variation of the distance r and the minimum relative refractive index difference Δn(F), the numeral 4.700 a target EMB (GHz·km) at the wavelength 0.850 μm, $B_{0.875}$ an EMB (GHz·km) at the wavelength 0.875 μm, with variation of the distance r and the minimum relative refractive index difference Δn(F), the numeral 4.200 a target EMB (GHz·km) at the wavelength 0.875 μm, $B_{0.900}$ an EMB (GHz·km) at the wavelength 0.900 μm, with variation of the distance r and the minimum relative refractive index difference Δn(F), the numeral 3.600 a target EMB kin) at the wavelength 0.900 μm, $B_{0.925}$ an EMB (GHz·km) at the wavelength 0.925 μm, with variation of the distance r and the minimum relative refractive index difference Δn(F), the numeral 3.300 a target EMB (GHz·km) at the wavelength 0.925 μm, $B_{0.950}$ an EMB (GHz·km) at the wavelength 0.950 μm, with variation of the distance r and the minimum relative refractive index difference Δn(F), and the numeral 3.100 a target EMB (GHz·km) at the wavelength 0.950 μm.

(8) As an eighth aspect applicable to at least any one of the foregoing fifth to seventh aspects, preferably, the partially F-doped region is doped with a constant doping amount of F along a radial direction of the core.

Details of Embodiment of Present Invention

Specific structures of GI-MMFs (multimode optical fibers having the GI refractive index profile) according to the embodiment of the invention will be described below in detail with reference to the accompanying drawings. It should be noted that the present invention is by no means intended to be limited to these examples presented by way of illustration but is intended for inclusion of all changes within the meaning and scope of equivalence to the scope of claims, as described in the scope of claims.

Figure 1B:
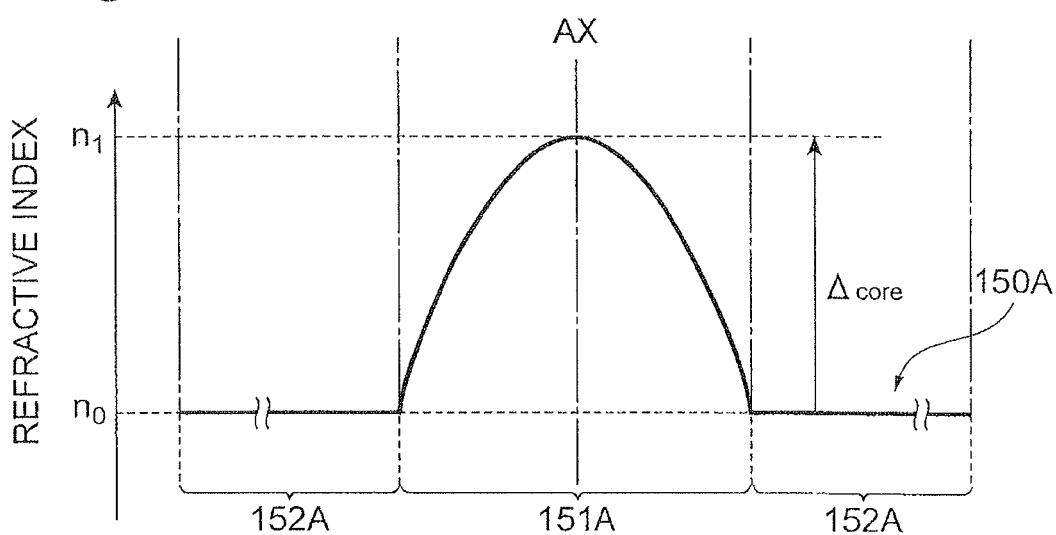

FIG. 1A is a cross-sectional view showing a typical structure of the GI-MMF according to the embodiment of the invention and FIG. 1B a refractive index profile thereof.

The GI-MMF 100 according to the embodiment of the invention has a core 110 extending along the optical axis AX and a cladding 120 provided on the outer periphery of the core 110, as shown in FIG. 1A. In the GI-MMF 100 shown in FIG. 1A, the whole region of the core 110 is doped with Ge as a base dopant for adjusting the shape of the refractive index profile. The core 110 is comprised of an inside region 110A including the optical axis AX, and an outside region 110B surrounding the outer periphery of the inside region 110A, and either one of these regions 110A, 110B is doped with P or F. Therefore, in a configuration wherein the core 110 is partially doped with P, either one of the inside region 110A and the outside region 110B is a partially P-doped region while the other is a P-undoped region. The partially P-doped region is a region intentionally doped with P. The P-undoped region is a region which is not intentionally doped with P and in which a doping amount of P is set to be not more than 5% of a maximum doping amount of P in the partially P-doped region. On the other hand, in a configuration wherein the core 110 is partially doped with F, either one of the inside region 110A and the outside region 110B is a partially F-doped region while the other is an F-undoped region. In this configuration as well, the partially F-doped region is a region intentionally doped with F. The F-undoped region is a region which is not intentionally doped with F and in which a doping amount of F is set to be not more than 5% of a maximum doping amount of F in the partially F-doped region.

As described above, in the core 110, the GI refractive index profile (cf., FIG. 1B) conforming to the α-profile is formed by Ge as the base dopant and P or F partially doped. This core 110 has the outside diameter 2a (radius a) and the maximum refractive index $n_1$. The cladding 120 is pure silica or a glass region doped with an impurity for adjustment of refractive index, and has the refractive index $n_0$ lower than the maximum refractive index $n_1$ of the core 110 ($n_0 < n_1$).

The refractive index profile 150A of the GI-MMF 100, shown in FIG. 1B, indicates the refractive indices of respective portions on a line L perpendicular to the optical axis AX (the line L coincides with the radial direction of the GI-MMF 100) and, more specifically, region 151A indicates the refractive indices of respective portions of the core 110 along the line L and region 152A the refractive indices of respective portions of the cladding 120 along the line L.

Particularly, the region 151A in the refractive index profile 150A in FIG. 1B has a dome shape (α-profile) such that the refractive index n(r) takes the maximum refractive index at the center of the core 110 coincident with the optical axis AX (or at a position where the optical axis AX intersects with the cross section of the GI-MMF 100), as expressed by Expression (3) below. The refractive index n(r) represents the refractive index of the core 110 with the radius a and refractive index at the position distant by r in the radial direction from the center of the core 110. The α value for defining this dome shape is from 1.8 to 2.2. The maximum relative refractive index difference $\Delta_{core}$ at the center of the core 110 with respect to the cladding 120 (which is equivalent to the maximum relative refractive index difference of the core 110 with respect to the cladding 120) is from 0.8 to 2.4%. The diameter of the core 110 is from 25 to 65 µm. In the present specification, the relative refractive index difference $\Delta_{core}$ of the core 110 (with the maximum refractive index $n_1$) with respect to the cladding 120 (with the refractive index $n_0$) is defined by Expression (4) below. The same definitions of the structural parameters such as the relative refractive index difference of the core as described above also apply to the embodiments, comparative example, and others which will be described below.

$$n(r) = \begin{cases} n_1 \sqrt{1 - 2\Delta_{core}\left(\frac{r}{a}\right)^\alpha} & (0 \leq r \leq a) \\ n_0 & (a < r) \end{cases} \quad (3)$$

$$\Delta_{core} = \frac{n_1^2 - n_0^2}{2n_1^2} \quad (4)$$

Here, $\Delta_{core}$ represents the maximum relative refractive index difference of the core with respect to the cladding, $n_1$ the refractive index (maximum refractive index) at the center of the core, $n_0$ the refractive index of the cladding, r the distance from the center of the core, a the radius of the core, and a the power a for determining the shape of the α-profile.

Figure 2A:
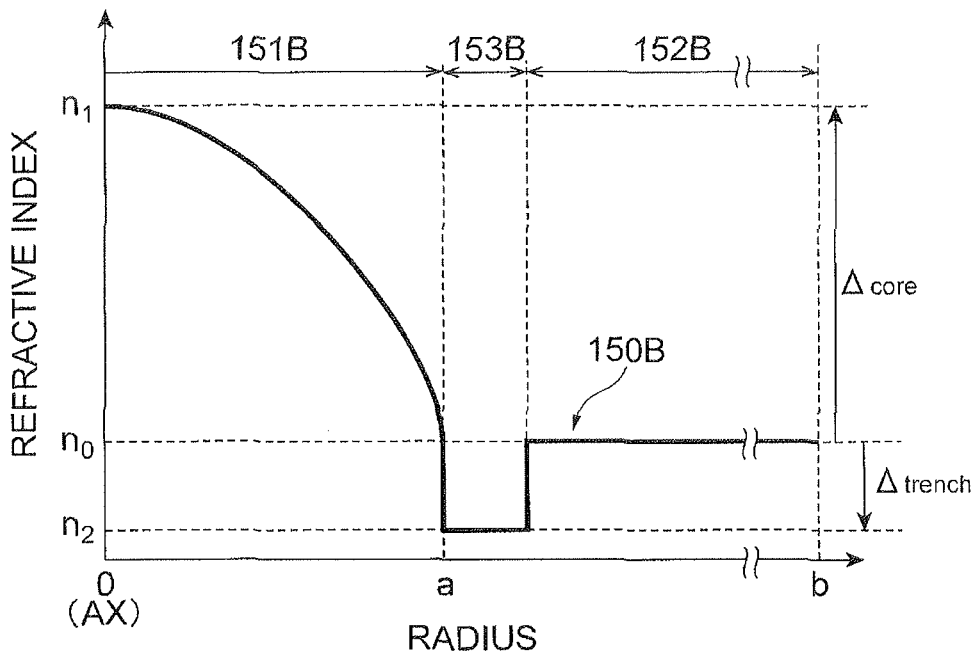
FIGS. 2A and 2B are refractive index profiles for showing various examples of cross-sectional structures of the GI-MMF according to the embodiment of the invention.
Figure 2B:
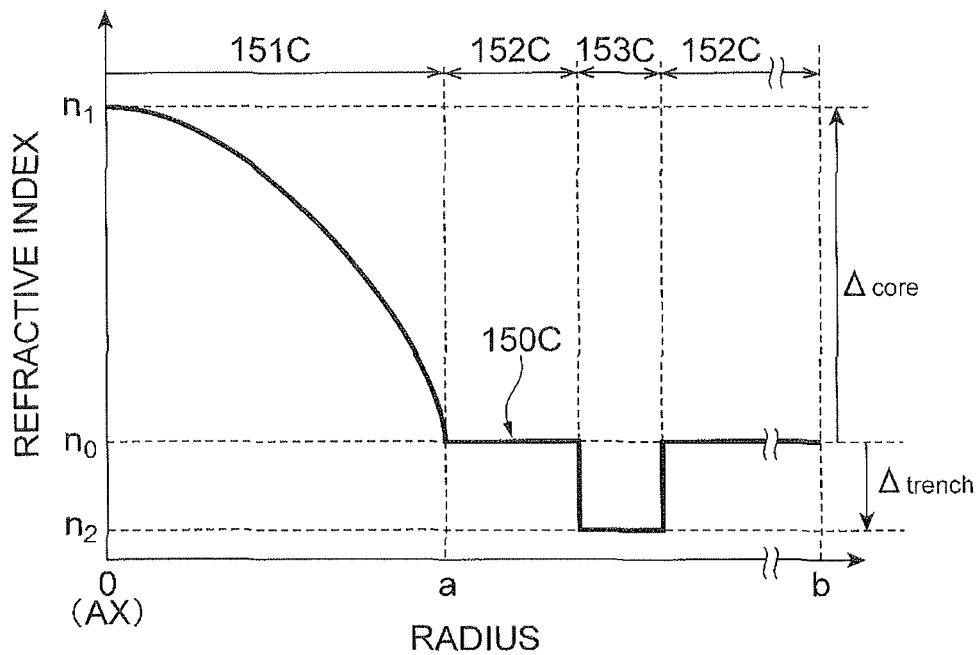

The structure of the GI-MMF according to the embodiment of the invention is not limited to the above-described structure (FIGS. 1A and 1B). For example, the GI-MMF according to the embodiment of the invention may have a trench portion having the refractive index $n_2$ lower than the refractive index $n_0$ of the cladding 120, in addition to the core 110 and the cladding 120. FIG. 2A and FIG. 2B are refractive index profiles for showing various examples of cross-sectional structures in the GI-MMF according to the embodiment of the invention.

The GI-MMF with the refractive index profile 150B shown in FIG. 2A has the core (with the maximum refractive index $n_1$) having the radius a and the cladding (with the refractive index $n_0$) having the radius b as the GI-MMF 100 shown in FIG. 1A does. Furthermore, this GI-MMF has the trench portion provided between the core and the cladding and having the refractive index $n_2$ lower than that of the cladding. The refractive index profile 150B shown in FIG. 2A indicates the refractive indices of respective portions on a reference line (corresponding to the line L in FIG. 1A) perpendicular to the optical axis AX and, more specifically, region 151B indicates the refractive indices of respective portions of the core along the reference line, region 152B the refractive indices of respective portions of the cladding along the reference line, and region 153B the refractive indices of respective portions of the trench portion along the reference line. In the present specification, the relative refractive index difference $\Delta_{trench}$ of the trench portion with respect to the cladding is defined by Expression (5) below.

$$\Delta_{trench} = \frac{n_2^2 - n_0^2}{2n_1^2} \quad (5)$$

The GI-MMF with the refractive index profile 150C shown in FIG. 2B has the core (with the maximum refractive index $n_1$) having the radius a and the cladding (with the refractive index $n_0$) having the radius b as the GI-MMF 100 shown in FIG. 1A does. Furthermore, this GI-MMF has the trench portion which is provided in the cladding while being distant by a predetermined distance from the core, and which has the refractive index $n_2$ lower than that of the cladding. The refractive index profile 150C shown in FIG. 2B indicates the refractive indices of respective portions on a reference line (corresponding to the line L in FIG. 1A) perpendicular to the optical axis AX and, more specifically, region 151C indicates the refractive indices of respective portions of the core along the reference line, region 152C the refractive indices of respective portions of the cladding along the reference line, and region 153C the refractive indices of respective portions of the trench portion along the reference line. In the example of FIG. 2B, the relative refractive index difference $\Delta_{trench}$ of the trench portion with respect to the cladding is also defined by the foregoing Expression (5).

The GI-MMF according to the embodiment of the invention has the structure as described above, and the GI refractive index profile of the core 110 is formed by the whole doping with Ge as the base dopant and the partial doping with P or F except for Ge. This allows the embodiment of the invention to achieve the widening of bandwidth in a wider wavelength range used in the WDM transmission, e.g., from 0.850 µm to 0.950 and to improve the manufacturing easiness of the refractive index profile of the core. A specific suggestion for the widening of bandwidth is the EMB which is one of transmission bandwidths, for example, as described in the foregoing Non Patent Literature 1. Specifically, in the suggestion of the foregoing Non Patent Literature 1, the EMB at the wavelength 0.850 µm (=850 nm) is not less than 4.700 GHz·km (=4700 MHz·km), the EMB at the wavelength 0.875 µm (=875 nm) is not less than 4.200 GHz·km (=4200 MHz·km), the EMB at the wavelength 0.900 µm (=900 nm) is not less than 3.600 GHz·km (=3600 MHz·km), the EMB at the wavelength 0.925 µm 925 nm) is not less than 3.300 GHz·km (=3300 MHz·km), and the EMB at the wavelength 0.950 µm (=950 nm) is not less than 3.100 GHz·km (=3100 MHz·km).

Then, the Inventors conducted the evaluation of bandwidth characteristics of the GI-MMF of the embodiment of the invention and the GI-MMF of a comparative example, using an evaluation function expressed by Expression (6) below. Namely, the evaluation function defined by Expression (6) is an index indicative of how larger the bandwidths of the GI-MMF are than the bandwidths at the respective wavelengths suggested in the foregoing Non Patent Literature 1.

$$\min\left(\frac{B_{0.850}}{4.700}, \frac{B_{0.875}}{4.200}, \frac{B_{0.900}}{3.600}, \frac{B_{0.925}}{3.300}, \frac{B_{0.950}}{3.100}\right) \quad (6)$$

where $B_{0.850}$ is an EMB (GHz·km) being one of transmission bandwidths at the wavelength 0.850 µm, the numeral 4.700 a target EMB (GHz·km) at the wavelength 0.850 µm, $B_{0.875}$ an EMB (GHz·km) at the wavelength 0.875 µm, the numeral 4.200 a target EMB (GHz·km) at the wavelength 0.875 µm, $B_{0.900}$ an EMB (GHz·km) at the wavelength 0.900 µm, the numeral 3.600 a target EMB (GHz·km) at the wavelength 0.900 µm, $B_{0.925}$ an EMB (GHz·km) at the wavelength 0.925 µm, the numeral 3.300 a target EMB (GHz·km) at the wavelength 0.925 µm, $B_{0.950}$ an EMB (GHz·km) at the wavelength 0.950 µm, and the numeral 3.100 a target EMB (GHz·km) at the wavelength 0.950 µm.

COMPARATIVE EXAMPLE

Figure 3A:
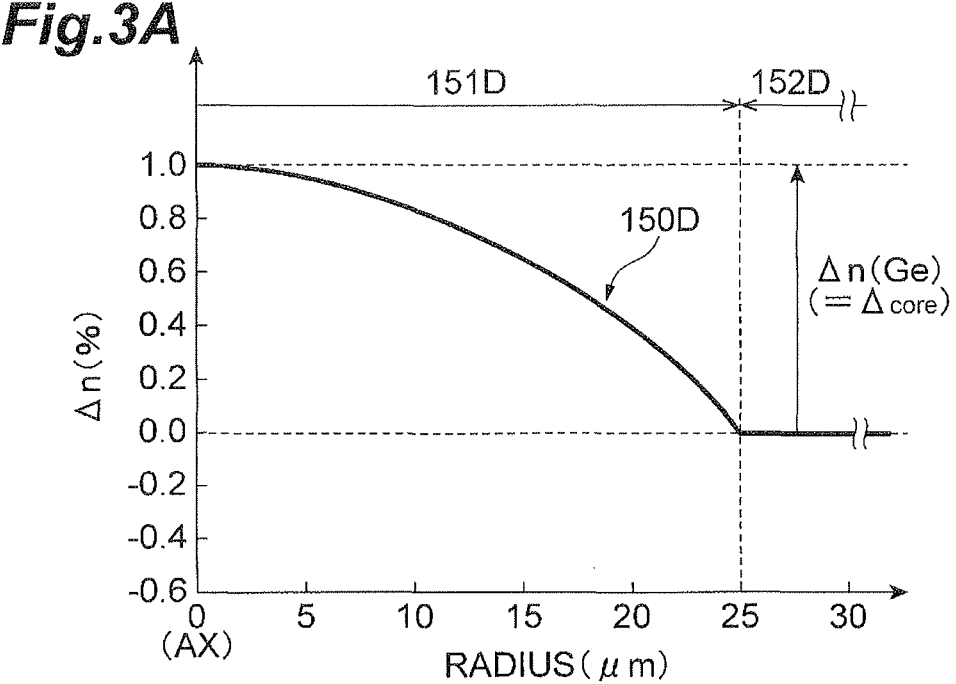
FIG. 3A is a refractive index profile of a GI-MMF according to a comparative example and FIG. 3B a graph showing wavelength dependence of EMB in the GI-MMF according to the comparative example.
Figure 3B:
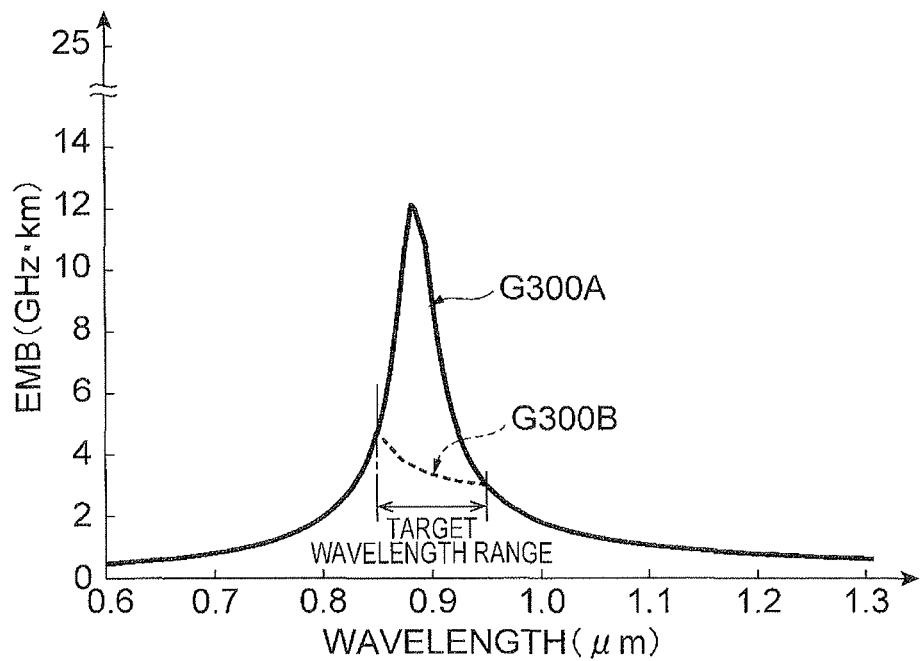

FIG. 3A is a refractive index profile of the GI-MMF according to a comparative example and FIG. 3B a graph showing wavelength dependence of EMB in the GI-MMF of the comparative example.

The GI-MMF of the comparative example has the core and the cladding as the GI-MMF 100 shown in FIG. 1A does. In this GI-MMF of the comparative example, however, the core is doped with Ge only and, in the refractive index profile 150D of FIG. 3A, region 151D indicates the relative refractive index differences of respective portions of the core (the relative refractive index differences of respective core portions with respect to the cladding) along the reference line (corresponding to the line L in FIG. 1A) perpendicular to the optical axis AX, and region 152D the relative refractive index differences of respective portions of the cladding along the reference line (0%).

In this GI-MMF of the comparative example, the core is doped with Ge only and has the outside diameter of 50 µm (the radius 25 µm). Furthermore, the core has the GI refractive index profile conforming to the α-profile because of the doping with Ge and the maximum relative refractive index difference $\Delta_{core}$ of the core with respect to the cladding, i.e., the maximum relative refractive index difference $\Delta n(Ge)$ resulting from the doping with Ge only is 1.0%. The shape of the α-profile was designed as follows: the shape of the α-profile at the wavelength 0.9 µm was designed so as to maximize the evaluation function; it was calculated by use of the WKB approximation (Wentzel-Kramers-Brillouin approximation). The α value (optimum value) in this case is 2.058. The cladding is comprised of pure silica glass and the outside diameter thereof is 125 µm.

In FIG. 3B, graph G300A indicates the EMBs of the GI-MMF of the comparative example optimized as described above, and graph G300B the target EMBs (minima) in the target wavelength range (from 0.85 µm to 0.95 µm), which are suggested in the foregoing Non Patent Literature 1. As also seen from FIG. 3B, the wavelength range of the GI-MMF (graph 300A) of the comparative example over the target EMBs is approximately coincident with the target wavelength range. This means that the shape of the α-profile in the core needs to be more accurately controlled in practical fiber manufacture (i.e., the manufacturing easiness is low).

First Embodiment

The following will describe the bandwidth evaluation of the GI-MMF of the first embodiment, using FIG. 4 and FIGS. 6A to 6C. The GI-MMF of the first embodiment is configured by doping the whole region of the core with Ge as a base dopant and doping a part of the core with P. The GI-MMF of the first embodiment has the same cross-sectional structure as the structure shown in FIG. 1A and has the refractive index profile 150A shown in FIG. 1B.

Figure 4:
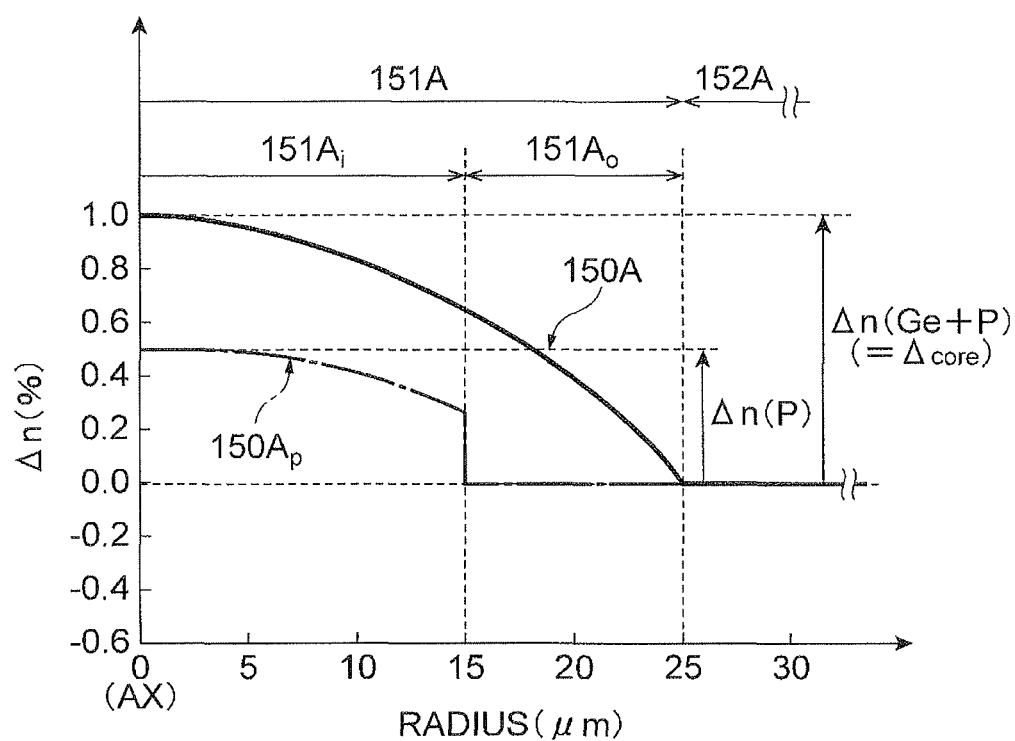
FIG. 4 is a refractive index profile for showing a cross-sectional structure of the GI-MMF according to the first embodiment.

Specifically, FIG. 4 is the refractive index profile for showing a specific sectional structure of the GI-MMF of the first embodiment. In FIG. 4, the refractive index profile 150A indicates the GI refractive index profile conforming to the α-profile, which results from doping with Ge and P, and the refractive index profile $150A_P$ the refractive index profile resulting from partial doping with P.

The GI-MMF of the first embodiment has the core 110 and the cladding 120 and the core 110 is comprised of an inside region 110A and an outside region 110B. Namely, in the GI-MMF of the first embodiment, the whole region (both of the inside region 110A and the outside region 110B) of the core 110 is doped with Ge as the base dopant and the inside region 110A of the core 110 is doped with P. On the other hand, the outside region 110B of the core 110 is doped with Ge but not doped with P. Therefore, in this first embodiment, the inside region 110A is a partially P-doped region and the outside region 110B a P-undoped region.

Specifically, in the refractive index profile 150A shown in FIG. 4, region 151A indicates the relative refractive index differences at respective portions of the core 110 along the line L (the relative refractive index differences of respective core portions with respect to the cladding 120), region 152A the relative refractive index difference of the cladding 120 along the line L (0%), region $151A_i$ the relative refractive index differences of the inside region 110A (partially P-doped region) along the line L (the relative refractive index differences at respective portions of the inside region with respect to the cladding 120), and region $151A_o$ the relative refractive index differences of the outside region 110B (P-undoped region) along the line L (the relative refractive index differences at respective portions of the outside region with respect to the cladding 120).

Figure 6A:
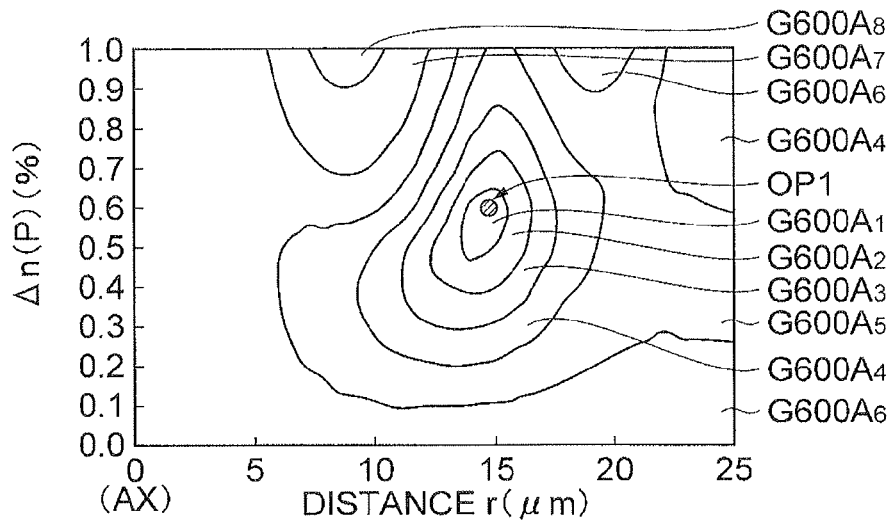
FIG. 6A is a map showing a distribution of evaluation function values for various combinations (r, Δn(P)) of distance r (μm) from the center of the core and relative refractive index difference Δn(P) (%) resulting from doping with P, in the GI-MMF of the first embodiment, FIG. 6B a map showing a distribution of optimum values for the α value at the wavelength 0.9 μm for the various combinations (r, Δn(P)), in the GI-MMF of the first embodiment, and FIG. 6C a graph showing wavelength dependence of EMB in the GI-MMF of the first embodiment.
Figure 6B:
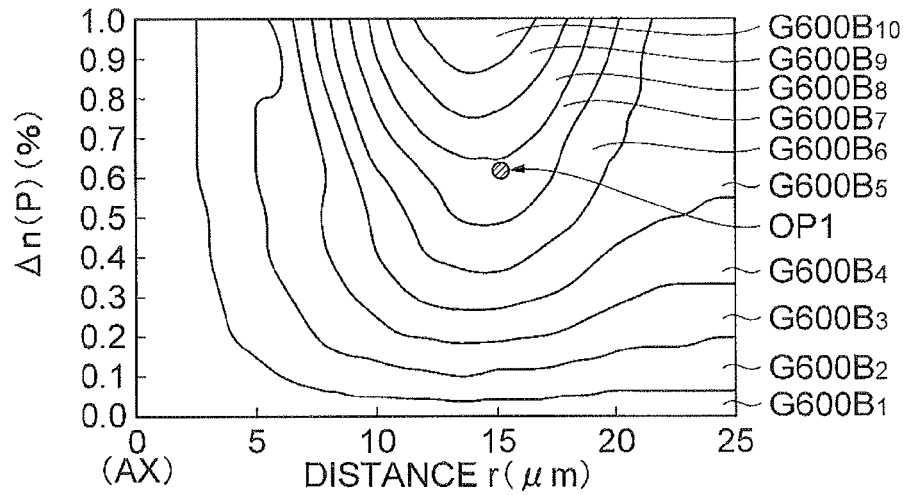
Figure 6C:
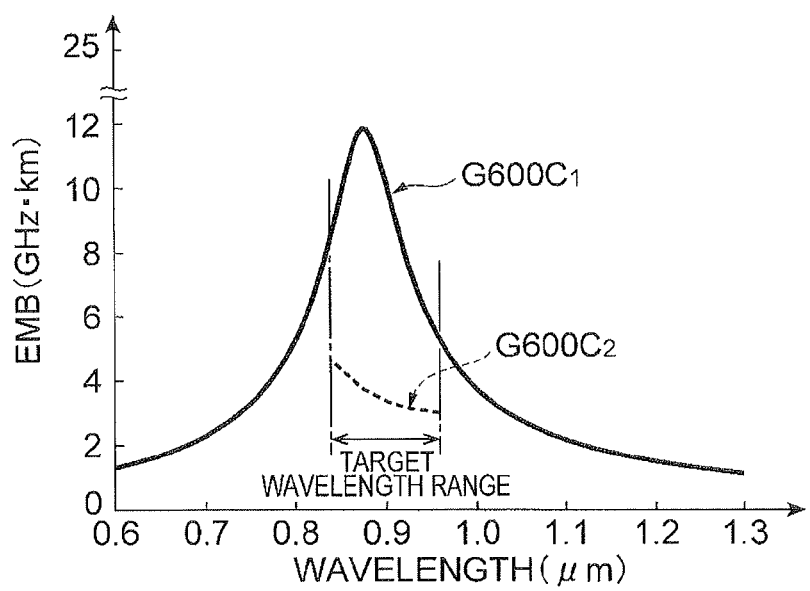

FIGS. 6A to 6C show the result of the bandwidth evaluation of the GI-MMF of the first embodiment configured as described above. In the GI-MMF of the first embodiment, the core 110 has the outside diameter of 50 µm (radius 25 µm). The core has the GI refractive index profile conforming to the α-profile because of the doping with Ge and P and the maximum relative refractive index difference $\Delta_{core}$ of the core with respect to the cladding, i.e., the maximum relative refractive index difference $\Delta n(Ge+P)$ resulting from the doping with Ge and P is 1.0%. In the region $151A_i$ (inside region 110A) the maximum relative refractive index difference resulting from the doping with P, $\Delta n(P)$, is 0.5% and in the region $151A_o$ (outside region 110B) the maximum relative refractive index difference resulting from the doping with P, $\Delta n(P)$, is substantially 0%. The boundary between the region $151A_i$ and the region $151A_o$ (the distance r from the core center coincident with the optical axis AX) is set at the position of 15 µm from the core center.

Specifically, FIG. 6A is a map indicative of eight numerical ranges grouped in a distribution of evaluation function values (0.6 to 2.2) for various combinations (r, $\Delta n(P)$) of the distance r (µm) from the core center in the range of 0 to 25 µm with the maximum relative refractive index difference $\Delta n(P)$ (%) resulting from the doping with P in the range of 0% to 1.0%, in the GI-MMF of the first embodiment. In FIG. 6A showing the distribution of evaluation function values, region $G600A_1$ to region $G600A_8$ indicate distributions of combinations (r, $\Delta n(P)$) with the evaluation function values falling within the range of 2.0 to 2.2, the range of 1.8 to 2.0, the range of 1.6 to 1.8, the range of 1.4 to 1.6, the range of 1.2 to 1.4, the range of 1.0 to 1.2, the range of 0.8 to 1.0, and the range of 0.6 to 0.8, respectively, in order. FIG. 6A also shows the optimum solution OP1 for the evaluation function.

FIG. 6B is a map indicative of ten numerical ranges grouped in a distribution of optimum values for the α value (numerals 2.010 to 2.060 calculated by use of the WKB approximation) at the wavelength 0.9 μm for the foregoing various combinations (r, Δn(P)), in the GI-MMF of the first embodiment. In FIG. 6B showing the distribution of optimum values for the α value, region $G600B_1$ to region $G600B_{10}$ indicate distributions of combinations (r, Δn(P)) with the optimum α values falling within the range of 2.055 to 2.060, the range of 2.050 to 2.055, the range of 2.045 to 2.050, the range of 2.040 to 2.045, the range of 2.035 to 2.040, the range of 2.030 to 2.035, the range of 2.025 to 2.030, the range of 2.020 to 2.025, the range of 2.015 to 2.020, and the range of 2.010 to 2.015, respectively, in order. FIG. 6B also shows the optimum solution OP1 for the optimum α value.

As seen from the foregoing FIGS. 6A and 6B, Δn(P) is preferably set around 0.6% and the distance r is preferably set around 15 am, in order to obtain the optimum solutions OP1 for the evaluation function and for the optimum α value. The refractive index profile $150A_P$ shown in FIG. 4 is set, approximately based on this calculation result. The shape of the bandwidth characteristic (wavelength dependence of EMB) of the GI-MMF of the first embodiment, which has the refractive index profile 150A corresponding to the refractive index profile of the whole core shown in FIG. 4, becomes the shape as shown in FIG. 6C. In FIG. 6C, the graph $G600C_1$ indicates the EMBs of the GI-MMF of the first embodiment optimized as described above, and graph $G600C_2$ the target EMBs (minima) in the target wavelength range (from 0.85 μm to 0.95 μm), which are suggested in the foregoing Non Patent Literature 1. As also seen from FIG. 6C, the wavelength range of the GI-MMF of the first embodiment (graph $G600C_1$) over the target EMBs is noticeably expanded compared to the target wavelength range. This means reduction in required accuracy for the shape of the α-profile in the core, in practical fiber manufacture (improvement in manufacturing easiness).

Second Embodiment

Figure 5:
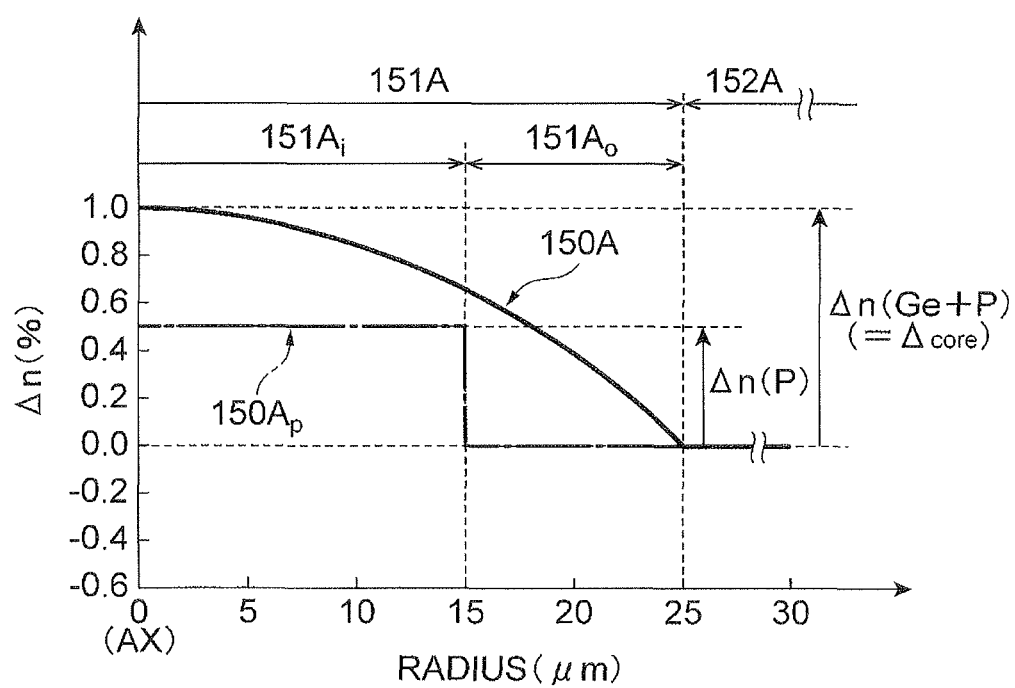
FIG. 5 is a refractive index profile for showing a cross-sectional structure of the GI-MMF according to the second embodiment.
Figure 7A:
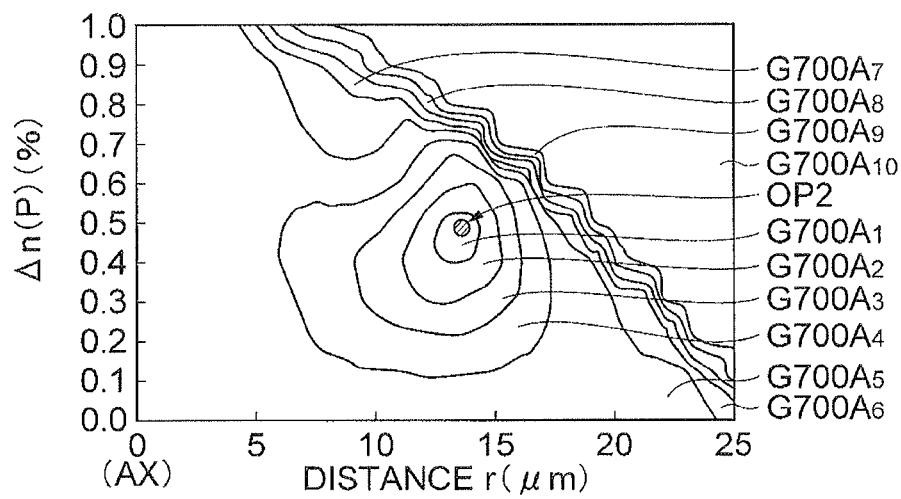
FIG. 7A is a map showing a distribution of evaluation function values for various combinations (r, Δn(P)) of distance r (μm) from the center of the core and relative refractive index difference Δn(P) (%) resulting from doping with P, in the GI-MMF of the second embodiment, FIG. 7B a map showing a distribution of optimum values for the α value at the wavelength 0.9 μm for the various combinations (r, Δn(P)), in the GI-MMF of the second embodiment, and FIG. 7C a graph showing wavelength dependence of EMB in the GI-MMF of the second embodiment.
Figure 7B:
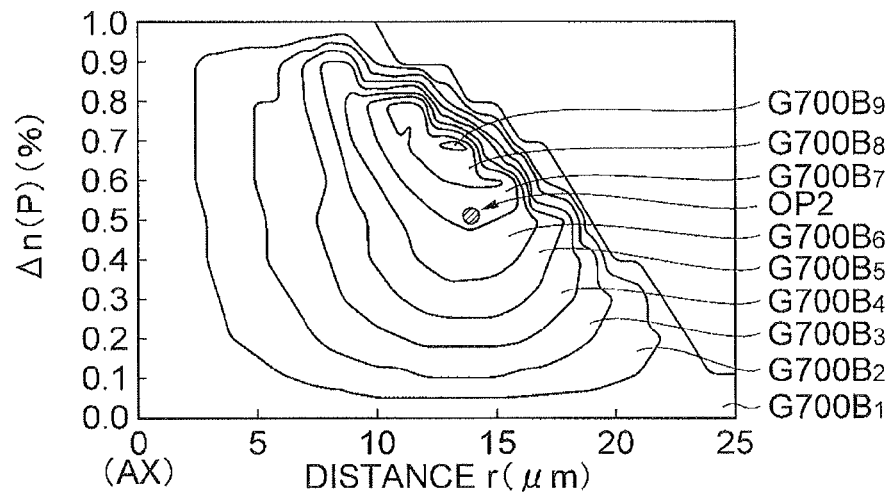
Figure 7C:
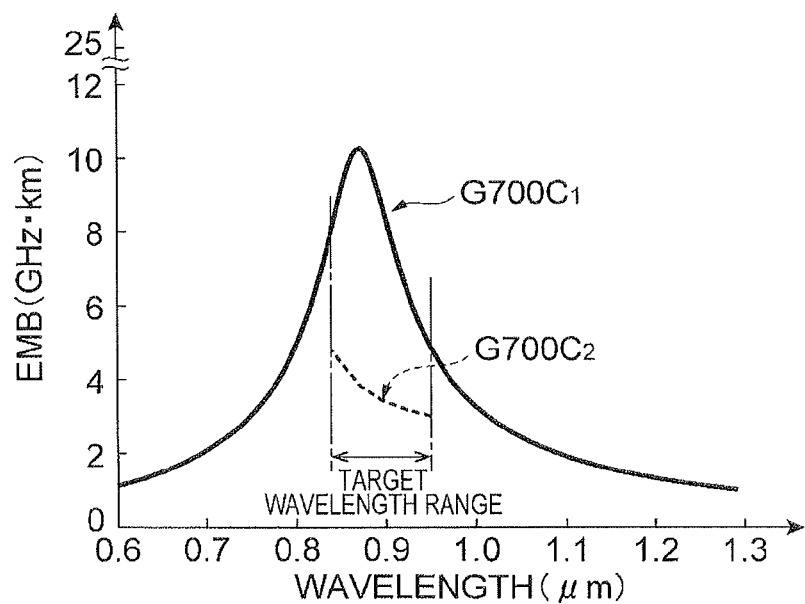

FIG. 5 is a refractive index profile for showing the cross-sectional structure of the GI-MMF according to the second embodiment and FIGS. 7A to 7C are drawings for explaining the evaluation result of the bandwidth characteristic in the GI-MMF of the second embodiment. The GI-MMF of the second embodiment, just as in the example of the first embodiment, is also configured by doping the whole region of the core with Ge as a base dopant and doping a part of the core with P. Furthermore, the GI-MMF of the second embodiment also has the same cross-sectional structure as the structure shown in FIG. 1A and has the refractive index profile 150A shown in FIG. 1B.

Specifically, FIG. 5 is the refractive index profile for showing a specific sectional structure of the GI-MMF of the second embodiment. In FIG. 5, the refractive index profile 150A indicates the GI refractive index profile conforming to the α-profile, which results from doping with Ge and P, and the refractive index profile $150A_P$ the refractive index profile resulting from partial doping with P. The refractive index profile of the first embodiment and the refractive index profile of the second embodiment are different in the shape of the refractive index profile $150A_P$ resulting from the doping with P in the inside region 110A (corresponding to the region $151A_i$ in FIG. 5) being the partially P-doped region. Namely, in the first embodiment, the shape of the refractive index profile $150A_P$ resulting from the doping with P in the inside region 110A is such that the relative refractive index difference Δn(P) resulting from the doping with P gradually decreases along the radial direction from the core center (the optical axis AX). On the other hand, in the GI-MMF of the second embodiment, the shape of the refractive index profile $150A_P$ resulting from the doping with P in the inside region 110A is such that the relative refractive index difference Δn(P) resulting from the doping with P is set to be constant along the radial direction from the core center (the optical axis AX).

The GI-MMF of the second embodiment has the core 110 and the cladding 120 and the core 110 is comprised of the inside region 110A and the outside region 110B, as in the example of the first embodiment. Namely, in the GI-MMF of the second embodiment, the whole region (both of the inside region 110A and the outside region 110B) of the core 110 is doped with Ge as the base dopant and the inside region 110A of the core 110 is doped with a constant doping concentration of P along the radial direction. On the other hand, the outside region 110B of the core 110 is doped with Ge but not doped with P. Therefore, in this second embodiment, the inside region 110A is a partially P-doped region and the outside region 110B a P-undoped region, as in the example of the first embodiment.

Specifically, in the refractive index profile 150A shown in FIG. 5, region 151A indicates the relative refractive index differences at respective portions of the core 110 along the line L (the relative refractive index differences of respective core portions with respect to the cladding 120), region 152A the relative refractive index difference of the cladding 120 along the line L (=0%), region $151A_i$ the relative refractive index differences of the inside region 110A (partially P-doped region) along the line L (the relative refractive index differences at respective portions of the inside region with respect to the cladding 120), and region $151A_o$ the relative refractive index differences of the outside region 110B (P-undoped region) along the line L (the relative refractive index differences at respective portions of the outside region with respect to the cladding 120).

FIGS. 7A to 7C show the result of the bandwidth evaluation of the GI-MMF of the second embodiment configured as described above. In the GI-MMF of the second embodiment, the core 110 has the outside diameter of 50 μm (radius 25 μm). The core has the GI refractive index profile conforming to the α-profile because of the doping with Ge and P and the maximum relative refractive index difference $\Delta_{core}$ of the core with respect to the cladding, i.e., the maximum relative refractive index difference Δn(Ge+P) resulting from the doping with Ge and P is 1.0%. In the region $151A_i$ (inside region 110A) the relative refractive index difference resulting from the doping with P, Δn(P), is 0.5% and in the region $151A_o$ (outside region 110B) the relative refractive index difference resulting from the doping with P, Δn(P), is substantially 0%. The boundary between the region $151A_i$ and the region $151A_o$ (the distance r from the core center coincident with the optical axis AX) is set at the position of 15 μm from the core center.

Specifically, FIG. 7A is a map indicative of ten numerical ranges grouped in a distribution of evaluation function values (0.0 to 2.0) for various combinations (r, Δn(P)) of the distance r (μm) from the core center in the range of 0 to 25 μm with the maximum relative refractive index difference Δn(P) (%) resulting from the doping with P in the range of 0% to 1.0%, in the GI-MMF of the second embodiment.

In FIG. 7A showing the distribution of evaluation function values, region $G700A_1$ to region $G700A_{10}$ indicate distributions of combinations (r, Δn(P)) with the evaluation function values falling within the range of 1.8 to 2.0, the range of 1.6 to 1.8, the range of 1.4 to 1.6, the range of 1.2 to 1.4, the range of 1.0 to 1.2, the range of 0.8 to 1.0, the range of 0.6 to 0.8, the range of 0.4 to 0.6, the range of 0.2 to 0.4, and the range of 0.0 to 0.2, respectively, in order. FIG. 7A also shows the optimum solution OP2 for the evaluation function.

FIG. 7B is a map indicative of nine numerical ranges grouped in a distribution of optimum values for the α value (numerals 2.015 to 2.060 calculated by use of the WKB approximation) at the wavelength 0.9 μm for the foregoing various combinations (r, Δn(P)), in the GI-MMF of the second embodiment. In FIG. 7B showing the distribution of optimum values for the α value, region $G700B_1$ to region $G700B_9$ indicate distributions of combinations (r, Δn(P)) with the optimum α values falling within the range of 2.055 to 2.060, the range of 2.050 to 2.055, the range of 2.045 to 2.050, the range of 2.040 to 2.045, the range of 2.035 to 2.040, the range of 2.030 to 2.035, the range of 2.025 to 2.030, the range of 2.020 to 2.025, and the range of 2.015 to 2.020, respectively, in order. FIG. 7B also shows the optimum solution OP2 for the optimum α value. In FIG. 7B, the region other than the regions $G700B_1$ to $G700B_9$ is the region where the optimum α value is outside 2.060.

As seen from the foregoing FIGS. 7A and 7B, Δn(P) is preferably set around 0.5% and the distance r is preferably set around 15 μm, in order to obtain the optimum solutions OP2 for the evaluation function and for the optimum α value. The refractive index profile $150A_P$ shown in FIG. 5 is set, approximately based on this calculation result. The bandwidth characteristic (wavelength dependence of EMB) of the GI-MMF of the second embodiment, which has the refractive index profile 150A corresponding to the refractive index profile of the whole core shown in FIG. 5, becomes the shape as shown in FIG. 7C. In FIG. 7C, graph $G700C_1$ indicates the EMBs of the GI-MMF of the second embodiment optimized as described above, and graph $G700C_2$ the target EMBs (minima) in the target wavelength range (from 0.85 μm to 0.95 μm), which are suggested in the foregoing Non Patent Literature 1. As also seen from FIG. 7C, the wavelength range of the GI-MMF of the second embodiment (graph $G700C_1$) over the target EMBs is noticeably expanded compared to the target wavelength range. This means reduction in required accuracy for the shape of the α-profile in the core, in practical fiber manufacture (improvement in manufacturing easiness).

Third Embodiment

Figure 8:
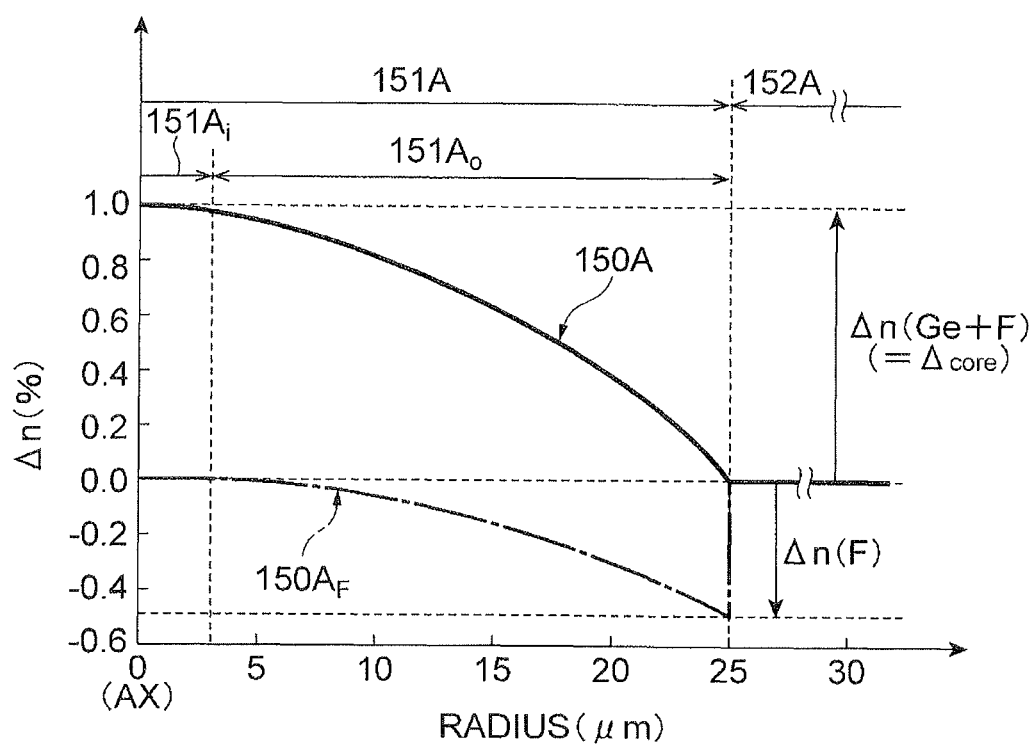
FIG. 8 is a refractive index profile for showing a cross-sectional structure of the GI-MMF according to the third embodiment.
Figure 10A:
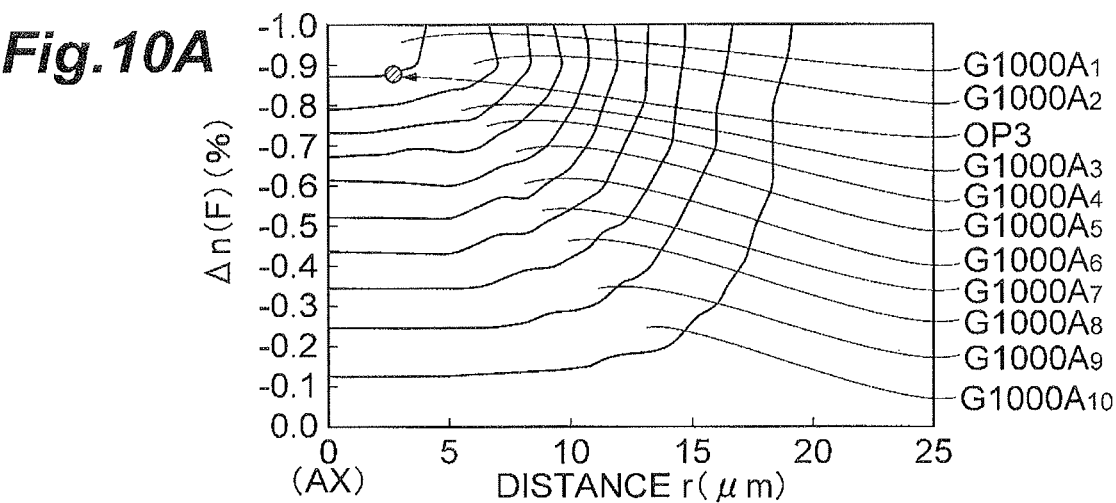
FIG. 10A is a map showing a distribution of evaluation function values for various combinations (r, Δn(F)) of distance r (μm) from the center of the core and relative refractive index difference Δn(F) (%) resulting from doping with F, in the GI-MMF of the third embodiment, FIG. 10B a map showing a distribution of optimum values for the α value at the wavelength 0.9 μm for the various combinations (r, Δn(F)), in the GI-MMF of the third embodiment, and FIG. 10C a graph showing wavelength dependence of EMB in the GI-MMF of the third embodiment.
Figure 10B:
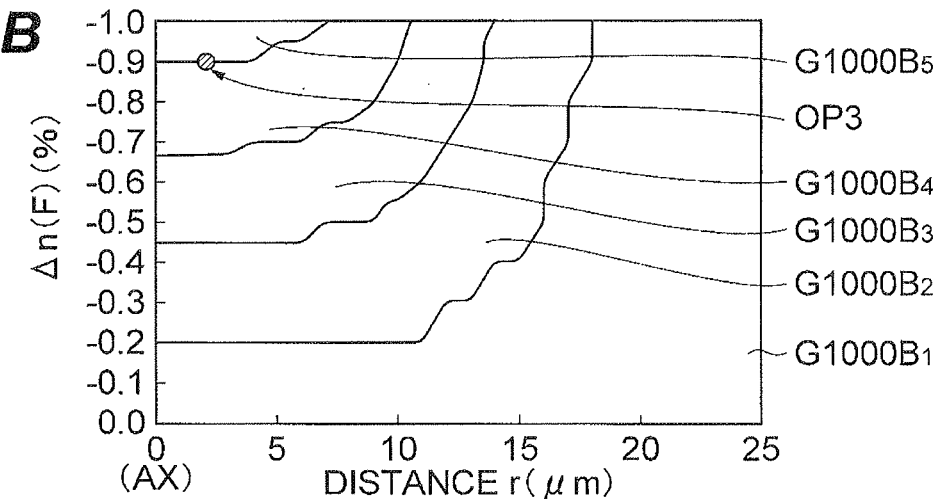
Figure 10C:
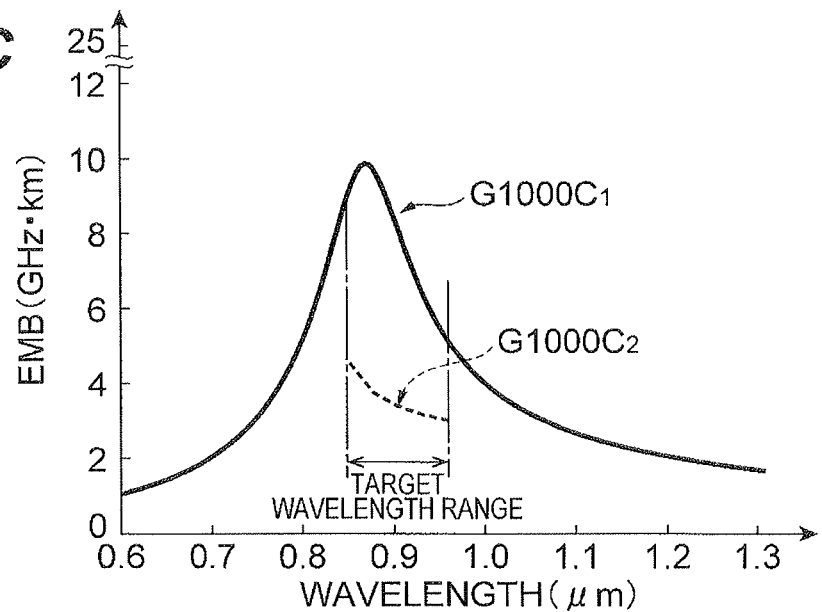

The foregoing first and second embodiments had the configuration wherein the core 110 was partially doped with P, while the third and fourth embodiments have the configuration wherein the core is partially doped with F, instead of P. Specifically, FIG. 8 is a refractive index profile for showing the cross-sectional structure of the GI-MMF according to the third embodiment and FIGS. 10A to 10C are drawings for explaining the evaluation result of the bandwidth characteristic in the GI-MMF of the third embodiment. The GI-MMF of the third embodiment is configured by doping the whole region of the core with Ge as a base dopant and doping a part of the core with F. Furthermore, the GI-MMF of the third embodiment also has the same cross-sectional structure as the structure shown in FIG. 1A and has the refractive index profile 150A shown in FIG. 1B.

Specifically, FIG. 8 is the refractive index profile for showing a specific sectional structure of the GI-MMF of the third embodiment. In FIG. 8, the refractive index profile 150A indicates the GI refractive index profile conforming to the α-profile, which results from doping with Ge and F, and the refractive index profile $150A_F$ the refractive index profile resulting from partial doping with F.

The GI-MMF of the third embodiment has the core 110 and the cladding 120 and the core 110 is comprised of the inside region 110A and the outside region 110B. Namely, in the GI-MMF of the third embodiment, the whole region (both of the inside region 110A and the outside region 110B) of the core 110 is doped with Ge as the base dopant and the outside region 110B of the core 110 is doped with F. On the other hand, the inside region 110A of the core 110 is doped with Ge but not doped with F. Therefore, in this third embodiment, opposite to the examples of the foregoing first and second embodiments, the inside region 110A is an F-undoped region and the outside region 110B a partially F-doped region.

Specifically, in the refractive index profile 150A shown in FIG. 8, region 151A indicates the relative refractive index differences at respective portions of the core 110 along the line L (the relative refractive index differences of respective core portions with respect to the cladding 120), region 152A the relative refractive index difference of the cladding 120 along the line L (=0%), region $151A_i$ the relative refractive index differences of the inside region 110A (F-undoped region) along the line L (the relative refractive index differences at respective portions of the inside region with respect to the cladding 120), and region $151A_o$ the relative refractive index differences of the outside region 110B (partially F-doped region) along the line L (the relative refractive index differences at respective portions of the outside region with respect to the cladding 120).

FIGS. 10A to 10C show the result of the bandwidth evaluation of the GI-MMF of the third embodiment configured as described above. In the GI-MMF of the third embodiment, the core 110 has the outside diameter of 50 μm (radius 25 μm). The core has the GI refractive index profile conforming to the α-profile because of the doping with Ge and F and the maximum relative refractive index difference $Δ_{core}$ of the core with respect to the cladding, i.e., the maximum relative refractive index difference Δn(Ge+F) resulting from the doping with Ge and F is 1.0%. In the region $151A_i$ (inside region 110A) the relative refractive index difference resulting from the doping with F, Δn(F), is substantially 0% and in the region $151A_o$ (outside region 110B) the minimum relative refractive index difference resulting from the doping with F, Δn(F), is −0.5%. The boundary between the region $151A_i$ and the region $151A_o$ (the distance r from the core center coincident with the optical axis AX) is set at the position of 3 μm from the core center.

Specifically, FIG. 10A is a map indicative of ten numerical ranges grouped in a distribution of evaluation function values (1.1 to 2.1) for various combinations (r, Δn(F)) of the distance r (μm) from the core center in the range of 0 to 25 μm with the minimum relative refractive index difference Δn(F) (%) resulting from the doping with F in the range of −1.0% to 0%, in the GI-MMF of the third embodiment. In FIG. 10A showing the distribution of evaluation function values, region $G1000A_1$ to region $G1000A_{10}$ indicate distributions of combinations (r, Δn(F)) with the evaluation function values falling within the range of 2.0 to 2.1, the range of 1.9 to 2.0, the range of 1.8 to 1.9, the range of 1.7 to 1.8, the range of 1.6 to 1.7, the range of 1.5 to 1.6, the range of 1.4 to 1.5, the range of 1.3 to 1.4, the range of 1.2 to 1.3, and the range of 1.1 to 1.2, respectively, in order. FIG. 10A also shows the optimum solution OP3 for the evaluation function. In FIG. 10A, the region other than the regions G1000A$_1$ to G1000A$_{10}$ is the region where the evaluation function value is not more than 1.1.

FIG. 10B is a map indicative of five numerical ranges grouped in a distribution of optimum values for the α value (numerals 2.035 to 2.060 calculated by use of the WKB approximation) at the wavelength 0.9 µm for the foregoing various combinations (r, Δn(F)), in the GI-MMF of the third embodiment. In FIG. 10B showing the distribution of optimum values for the α value, region G1000B$_1$ to region G1000B$_5$ indicate distributions of combinations (r, Δn(F)) with the optimum α values falling within the range of 2.055 to 2.060, the range of 2.050 to 2.055, the range of 2.045 to 2.050, the range of 2.040 to 2.045, and the range of 2.035 to 2.040, respectively, in order. FIG. 10B also shows the optimum solution OP3 for the optimum α value.

As seen from the foregoing FIGS. 10A and 10B, Δn(F) is preferably set around −0.9% and the distance r is preferably set around 3 µm, in order to obtain the optimum solutions OP3 for the evaluation function and for the optimum α value. The refractive index profile 150A$_F$ shown in FIG. 8 is set in such a manner that the minimum relative refractive index difference Δn(F) is −0.5% and that the position of the boundary between the inside region 110A and the outside region 110B (coincident with the radius of the inside region 110A) is 3 µm. The shape of the bandwidth characteristic (wavelength dependence of EMB) of the GI-MMF of the third embodiment, which has the refractive index profile 150A corresponding to the refractive index profile of the whole core shown in FIG. 8, becomes the shape as shown in FIG. 10C. In FIG. 10C, graph G1000C$_1$ indicates the EMBs of the GI-MMF of the third embodiment optimized as described above, and graph G1000C$_2$ the target EMBs (minima) in the target wavelength range (from 0.85 µm to 0.95 µm), which are suggested in the foregoing Non Patent Literature 1. As also seen from FIG. 10C, the wavelength range of the GI-MMF of the third embodiment (graph G1000C$_1$) over the target EMBs is noticeably expanded compared to the target wavelength range. This means reduction in required accuracy for the shape of the α-profile in the core, in practical fiber manufacture (improvement in manufacturing easiness).

Fourth Embodiment

Figure 9:
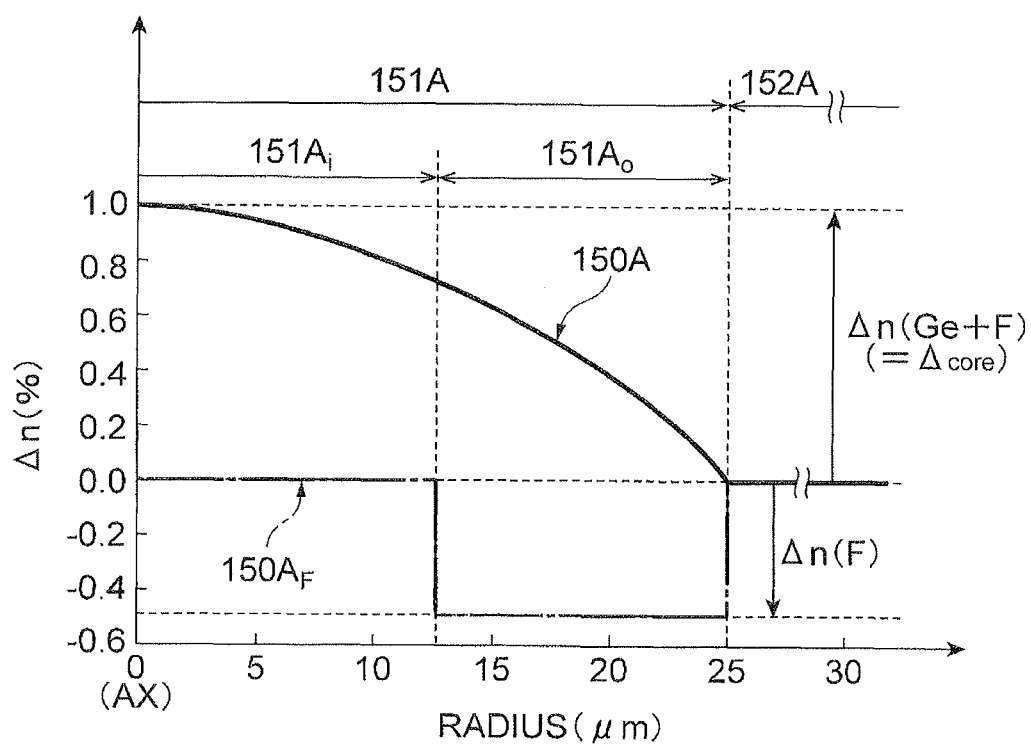
FIG. 9 is a refractive index profile for showing a cross-sectional structure of the GI-MMF according to the fourth embodiment.
Figure 11A:
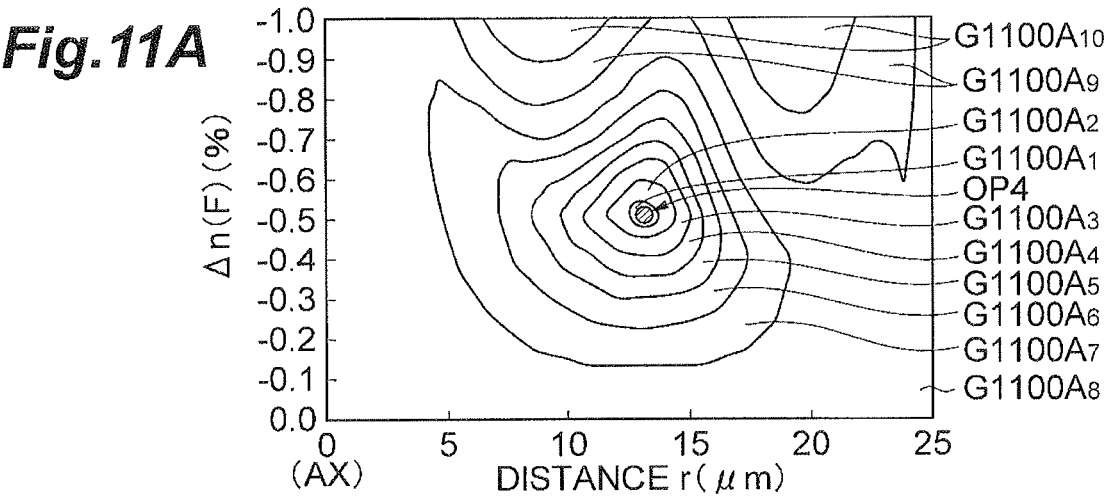
FIG. 11A is a map showing a distribution of evaluation function values for various combinations (r, Δn(F)) of distance r (μm) from the center of the core and relative refractive index difference Δn(F) (%) resulting from doping with F, in the GI-MMF of the fourth embodiment, FIG. 11B a map showing a distribution of optimum values for the α value at the wavelength 0.9 μm for the various combinations (r, Δn(F)), in the GI-MMF of the fourth embodiment, and FIG. 11C a graph showing wavelength dependence of EMB in the GI-MMF of the fourth embodiment.
Figure 11B:
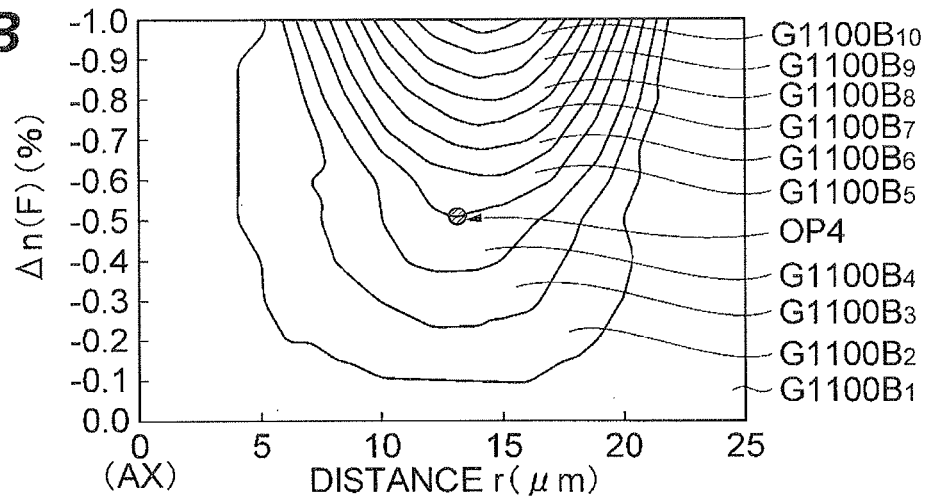
Figure 11C:
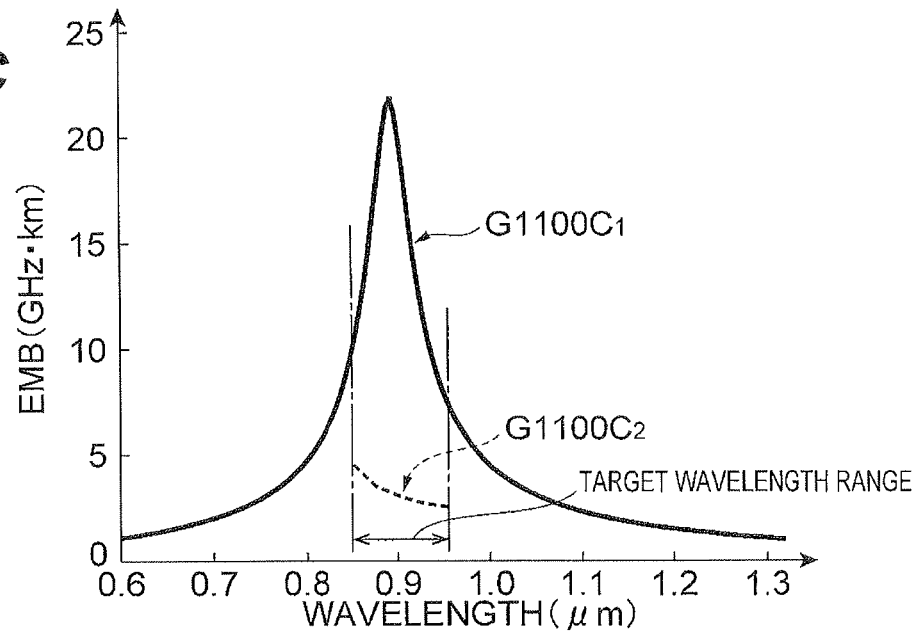

FIG. 9 is a refractive index profile for showing the cross-sectional structure of the GI-MMF according to the fourth embodiment and FIGS. 11A to 11C are drawings for explaining the evaluation result of the bandwidth characteristic in the GI-MMF of the fourth embodiment. The GI-MMF of the fourth embodiment, just as in the example of the third embodiment, is also configured by doping the whole region of the core with Ge as a base dopant and doping a part of the core with F. Furthermore, the GI-MMF of the fourth embodiment also has the same cross-sectional structure as the structure shown in FIG. 1A and has the refractive index profile 150A shown in FIG. 1B.

Specifically, FIG. 9 is the refractive index profile for showing a specific sectional structure of the GI-MMF of the fourth embodiment. In FIG. 9, the refractive index profile 150A indicates the GI refractive index profile conforming to the α-profile, which results from the doping with Ge and F, and the refractive index profile 150A$_F$ the refractive index profile resulting from the partial doping with F. The refractive index profile of the third embodiment and the refractive index profile of the fourth embodiment are different in the shape of the refractive index profile 150A$_F$ resulting from the doping with F in the outside region 110B (corresponding to the region 151A$_o$ in FIG. 9) being the partially F-doped region. Namely, in the third embodiment, the shape of the refractive index profile 150A$_F$ resulting from the doping with F in the outside region 110B is such that the relative refractive index difference Δn(F) resulting from the doping with F gradually decreases along the radial direction from the core center (the optical axis AX). On the other hand, in the GI-MMF of the fourth embodiment, the shape of the refractive index profile 150A$_F$ resulting from the doping with F in the outside region 110B is such that the relative refractive index difference Δn(F) resulting from the doping with F is set to be constant along the radial direction from the core center (the optical axis AX).

The GI-MMF of the fourth embodiment has the core 110 and the cladding 120 and the core 110 is comprised of the inside region 110A and the outside region 110B, as in the example of the third embodiment. Namely, in the GI-MMF of the fourth embodiment, the whole region (both of the inside region 110A and the outside region 110B) of the core 110 is doped with Ge as the base dopant and the outside region 110B of the core 110 is doped with a constant doping concentration of F along the radial direction. On the other hand, the inside region 110A of the core 110 is doped with Ge but not doped with F. Therefore, in this fourth embodiment, the inside region 110A is an F-undoped region and the outside region 110B a partially F-doped region, as in the example of the third embodiment.

Specifically, in the refractive index profile 150A shown in FIG. 9, region 151A indicates the relative refractive index differences at respective portions of the core 110 along the line L (the relative refractive index differences of respective core portions with respect to the cladding 120), region 152A the relative refractive index difference of the cladding 120 along the line L (=0%), region 151A$_i$ the relative refractive index differences of the inside region 110A (F-undoped region) along the line L (the relative refractive index differences at respective portions of the inside region with respect to the cladding 120), and region 151A$_o$ the relative refractive index differences of the outside region 110B (partially F-doped region) along the line L (the relative refractive index differences at respective portions of the outside region with respect to the cladding 120).

FIGS. 11A to 11C show the result of the bandwidth evaluation of the GI-MMF of the fourth embodiment configured as described above. In this GI-MMF of the fourth embodiment, the core 110 has the outside diameter of 50 µm (radius 25 µm). The core has the GI refractive index profile conforming to the α-profile because of the doping with Ge and F and the maximum relative refractive index difference $Δ_{core}$ of the core with respect to the cladding, i.e., the maximum relative refractive index difference Δn(Ge+F) resulting from the doping with Ge and F is 1.0%. In the region 151A$_i$ (inside region 110A) the relative refractive index difference resulting from the doping with F, Δn(F), is substantially 0% and in the region 151A$_o$ (outside region 110B) the relative refractive index difference resulting from the doping with F, Δn(F), is −0.5%. The boundary between the region 151A$_i$ and the region 151A$_o$ (the distance r from the core center coincident with the optical axis AX) is set at the position of 12.5 µm from the core center.

Namely, FIG. 11A is a map indicative of ten numerical ranges grouped in a distribution of evaluation function values (0.6 to 2.6) for various combinations (r, Δn(F)) of the distance r (µm) from the core center in the range of 0 to 25 µm with the minimum relative refractive index difference Δn(F) (%) resulting from the doping with F in the range of −1.0% to 0%, in the GI-MMF of the fourth embodiment. In FIG. 11A showing the distribution of evaluation function values, region G1100A$_1$ to region G1100A$_{10}$ indicate distributions of combinations (r, Δn(F)) with the evaluation function values falling within the range of 2.4 to 2.6, the range of 2.2 to 2.4, the range of 2.0 to 2.2, the range of 1.8 to 2.0, the range of 1.6 to 1.8, the range of 1.4 to 1.6, the range of 1.2 to 1.4, the range of 1.0 to 1.2, the range of 0.8 to 1.0, and the range of 0.6 to 0.8, respectively, in order. FIG. 11A also shows the optimum solution OP4 for the evaluation function.

FIG. 11B is a map indicative of ten numerical ranges grouped in a distribution of optimum values for the α value (numerals 2.010 to 2.060 calculated by use of the WKB approximation) at the wavelength 0.9 μm for the foregoing various combinations (r, Δn(F)), in the GI-MMF of the fourth embodiment. In FIG. 11B showing the distribution of optimum values for the α value, region G1100B$_1$ to region G1100B$_{10}$ indicate distributions of combinations (r, Δn(F)) with the optimum α values falling within the range of 2.055 to 2.060, the range of 2.050 to 2.055, the range of 2.045 to 2.050, the range of 2.040 to 2.045, the range of 2.035 to 2.040, the range of 2.030 to 2.035, the range of 2.025 to 2.030, the range of 2.020 to 2.025, the range of 2.015 to 2.020, and the range of 2.010 to 2.015, respectively, in order. FIG. 11B also shows the optimum solution OP4 for the optimum α value. Furthermore, the region other than the regions G1100B$_1$ to G1100B$_{10}$ is the region where the optimum α value is not more than 2.010.

As seen from the foregoing FIGS. 11A and 11B, Δn(F) is preferably set around −0.5% and the distance r is preferably set around 13 μm, in order to obtain the optimum solutions OP4 for the evaluation function and for the optimum α value. The refractive index profile 150A$_F$ shown in FIG. 9 is set, approximately based on this calculation result. The bandwidth characteristic (wavelength dependence of EMB) of the GI-MMF of the fourth embodiment, which has the refractive index profile 150A corresponding to the refractive index profile of the whole core shown in FIG. 9, becomes the shape as shown in FIG. 11C. In FIG. 11C, graph G1100C$_1$ indicates the EMBs of the GI-MMF of the fourth embodiment optimized as described above, and graph G1100C$_2$ the target EMBs (minima) in the target wavelength range (0.85 μm to 0.95 μm), which are suggested in the foregoing Non Patent Literature 1. As also seen from FIG. 11C, the wavelength range of the GI-MMF of the fourth embodiment (graph G1100C$_1$) over the target EMBs is noticeably expanded compared to the target wavelength range. This means reduction in required accuracy for the shape of the α-profile in the core, in practical fiber manufacture (improvement in manufacturing easiness).

In the embodiment of the present invention, as described above, the whole core is doped with Ge as the base dopant and only a part of the core is doped with P or F. By the configuration wherein P or F is partially doped in the core in which the GI refractive index profile is formed as described above and in which the base dopant is Ge, it becomes feasible to decrease the percentage of occupancy in the whole region of the core, of the region where the doping concentrations of the multiple dopants need to be highly accurately controlled, in the cross section of the core. As a result, the present invention has made it feasible to improve the manufacturing easiness of the refractive index profile of the core, in the GI-MMF achieving the widening of bandwidth in the wider wavelength range (e.g., from 0.850 μm to 0.950 μm) used in the WDM transmission.

From the above description of the present invention, it would be obvious that the present invention may be varied in many ways. Such variations are not to be regarded as a departure from the spirit and scope of the invention, and all improvements as would be obvious to those skilled in the art are intended for inclusion within the scope of claims which follows.

What is claimed is:
1. A multimode optical fiber comprising:
a core extending along a predetermined axis and doped with germanium and fluorine; and
a cladding provided on an outer peripheral surface of the core,
wherein the core has a Graded-Index type refractive index profile formed by doping with the germanium and the fluorine,
wherein in a cross section of the core perpendicular to the predetermined axis a germanium-doped region doped with the germanium coincides with a whole region of the cross section of the core,
wherein in the cross section of the core, the germanium-doped region is comprised of a partially fluorine-doped region in which a relative refractive index difference with respect to the cladding, resulting from the doping with the fluorine, is controlled; and a fluorine-undoped region in which a doping amount of the fluorine is set to be not more than 5% of a maximum doping amount of the fluorine in the partially fluorine-doped region, and
wherein in the germanium-doped region, the partially fluorine-doped region is arranged so as to surround the whole of the fluorine-undoped region.
2. The multimode optical fiber according to claim 1, wherein the partially fluorine-doped region and the fluorine-undoped region are arranged in contact with each other, and
wherein when r represents a distance from a center of the core to a boundary between the partially fluorine-doped region and the fluorine-undoped region and Δn(F) does a minimum relative refractive index difference resulting from the doping with the fluorine in the partially fluorine-doped region with respect to the cladding, the distance r is set so that an evaluation function defined by Expression (2) below becomes maximum,

$$\min\left(\frac{B_{0.850}}{4.700}, \frac{B_{0.875}}{4.200}, \frac{B_{0.900}}{3.600}, \frac{B_{0.925}}{3.300}, \frac{B_{0.950}}{3.100}\right) \qquad (2)$$

where $B_{0.850}$ is an EMB (GHz·km) being one of transmission bandwidths at the wavelength 0.850 μm, with variation of the distance r and the minimum relative refractive index difference Δn(F), the numeral 4.700 a target EMB (GHz·km) at the wavelength 0.850 μm, $B_{0.875}$ an EMB (GHz·km) at the wavelength 0.875 μm, with variation of the distance r and the minimum relative refractive index difference Δn(F), the numeral 4.200 a target EMB (GHz·km) at the wavelength 0.875 μm, $B_{0.900}$ an EMB (GHz·km) at the wavelength 0.900 μm, with variation of the distance r and the minimum relative refractive index difference Δn(F), the numeral 3.600 a target EMB (GHz·km) at the wavelength 0.900 μm, $B_{0.925}$ an EMB (GHz·km) at the wavelength 0.925 μm, with variation of the distance r and the minimum relative refractive index difference Δn(F), the numeral 3.300 a target EMB (GHz·km) at the wavelength 0.925 μm, $B_{0.950}$ an EMB (GHz·km) at the wavelength 0.950 μm, with variation of the distance r and the minimum relative refractive index difference $\Delta n(F)$, and the numeral 3.100 a target EMB (GHz·km) at the wavelength 0.950 μm.

* * * * *